(12) United States Patent
Lim et al.

(10) Patent No.: US 12,732,112 B2
(45) Date of Patent: Sep. 8, 2026

(54) OVERLOAD PROTECTION IN A VOLTAGE CONVERTER BASED ON FEEDBACK FROM A CIRCUIT POWERED BY THE VOLTAGE CONVERTER

(71) Applicant: Infineon Technologies Austria AG, Villach (AT)

(72) Inventors: Teik Eng Lim, Singapore (SG); Jianwei Liu, Singapore (SG); Josef Fisch, Petersberg (DE); Martin Krüger, Oberschleißheim (DE)

(73) Assignee: Infineon Technologies Austria AG, Villach (AT)

( * ) Notice: Subject to any disclaimer, the term of this patent is extended or adjusted under 35 U.S.C. 154(b) by 631 days.

(21) Appl. No.: 18/119,033

(22) Filed: Mar. 8, 2023

(65) Prior Publication Data

US 2024/0305206 A1 Sep. 12, 2024

(51) Int. Cl.
*H02M 1/42* (2007.01)
*H02M 1/00* (2006.01)
(Continued)

(52) U.S. Cl.
CPC ..... *H02M 3/33569* (2013.01); *H02M 1/0009* (2021.05); *H02M 1/325* (2021.05); *H02M 1/4208* (2013.01); *H02M 3/33523* (2013.01)

(58) Field of Classification Search
CPC ...... H02M 7/519; H02M 7/521; H02M 7/523; H02M 7/75; H02M 7/757; H02M 7/7575; H02M 7/66; H02M 7/68; H02M 7/72; H02M 7/483; H02M 2007/4835; H02M 7/487; H02M 1/08; H02M 1/084; H02M 1/0845; H02M 7/515; H02M 7/525; H02M 7/527; H02M 7/529; H02M 7/539; H02M 3/22; H02M 1/36; H02M 3/24; H02M 3/325; H02M 3/335; H02M 3/28; H02M 3/33569; H02M 3/33507; H02M 2007/4815; H02M 2007/4818;
(Continued)

(56) References Cited

U.S. PATENT DOCUMENTS

| | | | | |
|---|---|---|---|---|
| 10,355,605 B1 * | 7/2019 | Lin | .................. | H02M 3/33507 |
| 2012/0106208 A1 * | 5/2012 | Sugawara | ......... | H02M 3/33523 363/21.13 |
| 2018/0109173 A1 * | 4/2018 | Nishijima | ......... | H02M 3/33569 |

* cited by examiner

*Primary Examiner* — Crystal L Hammond
*Assistant Examiner* — Nusrat Quddus
(74) *Attorney, Agent, or Firm* — Armis IP Law, LLC

(57) ABSTRACT

An apparatus (such as a power converter circuit) includes s primary winding, an auxiliary winding, and an over-load protection circuit (such as a controller and corresponding one or more circuit components). A secondary winding is magnetically coupled to the primary winding and the second auxiliary winding. The controller controls input current through the primary winding of the transformer to produce an output voltage from the secondary winding. The controller monitors a magnitude of an auxiliary voltage received from the auxiliary winding magnetically coupled to the primary winding. The controller detects an overload condition associated with the output voltage based on the magnitude of the auxiliary voltage received from the auxiliary winding. In response to detecting the overload condition, the controller can be configured to reduce a magnitude of the input current inputted to the primary winding, preventing damage to the power converter circuit and corresponding circuitry.

20 Claims, 13 Drawing Sheets

(51) Int. Cl.
*H02M 1/32* (2007.01)
*H02M 3/335* (2006.01)

(58) Field of Classification Search
CPC ............. H02M 1/083; H02M 3/33538; H02M 3/33546; H02M 3/33515; H02M 3/33576; H02M 3/33592; H02M 3/33553; H02M 3/33523; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17; Y02B 70/1491; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069
See application file for complete search history.

OVERLOAD PROTECTION IN A VOLTAGE CONVERTER BASED ON FEEDBACK FROM A CIRCUIT POWERED BY THE VOLTAGE CONVERTER

BACKGROUND

As its name suggests, a conventional voltage converter converts a received input voltage into a corresponding output voltage to power a load.

A conventional voltage converter may be configured to include a primary winding, secondary winding, and an auxiliary winding to produce the output voltage. A voltage signal generated by the auxiliary winding can be used as a basis to power one or more components such as a controller on the primary side.

In a specific implementation, a conventional voltage can be configured to convert an input voltage into a respective output voltage to power a main circuit board. For example, a conventional television power supply (such as supplying over 75 W input power) may include a boost converter for PFC (Power Factor Converter) stage (PFC) and LLC resonant converter for DC-DC stage due to its high efficiency. The conventional LLC resonant converter may be configured to regulate the output voltage with information from LLC feedback voltage (such as a so-called signal HBFB signal), defined by a circuitry on primary and/or secondary side. The output voltage may be controlled by a controller changing the LLC resonant converter's switching frequency.

BRIEF DESCRIPTION

As discussed herein, a conventional television can be configured to include a PSON/OFF control power supply switch to define normal mode during PSON and standby mode during PSOFF. In the standby mode operation (PSOFF mode), a resonant voltage converter in the power supply can be configured to decrease a 12 VDC output (that supplies power to a main circuit board) of the power supply to a lower regulated output voltage (e.g., 8 VDC) to the main circuit board, by changing a voltage divider at a secondary side of the power supply depending on the selected operational mode of the power to the main circuit board. The voltage divider controls a magnitude of a feedback signal supplied to a controller on the primary side. The voltage divider enables the controller to achieve low system standby power and still provide power to the main circuit board. In other words, the main circuit board associated with the conventional television may be supplied around 8 VDC during a PSOFF mode and 12 VDC during a PSON mode; the controller regulating the magnitude of the output voltage based on the feedback signal during both the PSON and PSOFF modes. The voltage divider controls a gain associated with producing feedback signal and thus the magnitude of the output voltage based on the selected operational mode PSON or PSOFF.

In the event of excessive load drawn at the output of the power converter during a PSON mode as discussed above, the voltage converter may continue to provide the power to maintain targeted voltage level within targeted system design output power range. If the output power is higher than target system design level during the PSON mode, so-called OCP1 (over-current) protection implemented by the power converter on the primary side will shut down the controller to protect the system. For OCP1 protection, a controller circuit senses the LLC current (so-called input current) through a primary winding via a shunt between LS switch source and primary ground or by a capacitive current network. In both cases of PSON and PSOFF, the voltage at one pin (CS pin) of the power supply (V_LLCCS) represents the LLC current. The higher the peak of the voltage at the CS pin, the higher the load. If the voltage at the CS pin exceeds the so-called OCP1 threshold while the main circuit board is in the PSON mode, then OCP1 protection applies. In other words, the controller reduces current inputted to the primary winding to prevent harm on the secondary side based on a CS signal as discussed herein. This disclosure addresses the issue of overload protection during a condition associated with the main circuit board when the PSOFF mode is selected. This includes monitoring a magnitude of a VCC sign generated by an auxiliary winding magnetically coupled to the primary winding.

More specifically, embodiments herein include an apparatus. The apparatus (such as a power converter circuit) includes a transformer and an overload protection circuit. The transformer includes a primary winding, an auxiliary winding, and a secondary winding. The auxiliary winding is magnetically coupled to the primary winding. The secondary winding is magnetically coupled to the primary winding and the auxiliary winding. A controller operates in multiple different modes (such as a first operating mode and a second operating mode, a.k.a., non-burst mode or burst mode) to control current through the primary winding of the transformer to produce an output voltage from the secondary winding. For example, the controller monitors a magnitude of an auxiliary voltage received from an auxiliary winding magnetically coupled to the secondary winding. The controller detects an overload condition associated with the output voltage based on the magnitude of the auxiliary voltage received from the auxiliary winding and a mode of operating the controller.

In accordance with further example, to detect the overload condition, the controller is further operative to: compare the magnitude of the auxiliary voltage to a threshold level; and determine occurrence of the overload condition based on the magnitude of the auxiliary voltage being below the threshold level and the controller operating in the first operating mode for a predetermined time duration.

The overload condition may be an overcurrent condition of the output voltage supplying an output current to a load.

In still further examples, the auxiliary voltage provides power to the controller.

Yet further, the primary winding may be electrically coupled to a capacitor to form a resonant circuit path. The controller may be operative to control application of an input voltage and a reference voltage to the resonant circuit path prior to detecting the overload condition to regulate a magnitude of the output voltage via control of the input current through the primary winding.

Still further, the secondary winding may be disposed in a galvanically isolated domain with respect to the primary winding, the secondary winding having circuitry deriving a feedback signal from the output voltage. The controller can be configured to regulate a magnitude of the output voltage based on the feedback signal. The feedback signal may be received by the controller in a galvanically isolated manner.

The controller can be configured to control operation of a first switch and a second switch coupled to the primary winding to control the magnitude of the input current through the primary winding.

In accordance with a further example, the apparatus as discussed herein may include multiple switches controlled by the controller. The controller can be configured to operate the multiple switches in the first operating mode and the second operating mode. The first operating mode is a non-burst mode. The second operating mode is a burst mode. Operation in the burst mode may include repeatedly switching of the multiple switches ON and OFF in a first sequence of multiple control cycles followed by simultaneous deactivation of the multiple switches in a break including a second sequence of multiple control cycles; and operation in the non-burst mode may include switching of the multiple switches ON and OFF in a third sequence of multiple control cycles without implementing the break of simultaneously deactivating the multiple switches.

In a yet further example, the apparatus may include multiple switches controlled by the controller. The control is operative to: i) in the first operating mode, implement a first sequence of switch control cycles of switching the multiple switches ON and OFF to increase a magnitude of the input current through the primary winding and ii) in the second operating mode, implement a second sequence of switch control cycles of simultaneously deactivating the multiple switches to decrease the magnitude of the input current through the primary winding.

In a further example, a circuit powered by the output voltage is selectable between a first output voltage mode and a second output voltage mode. The circuit may includes a feedback signal generator operative to produce a feedback signal based on a magnitude of the output voltage. The controller is further operative to use the feedback signal as a basis to regulate a magnitude of the output voltage. The controller can be configured to detect the overload condition associated with the output voltage during operation of the circuit in the second output voltage mode. A feedback generator in the circuitry adjusts the feedback signal depending on setting of the circuit to the first output voltage mode versus the second output voltage mode, selection of the first output voltage mode resulting in the controller producing the output voltage at a first magnitude, selection of the second output voltage mode resulting in the controller producing the output voltage at a second magnitude.

The controller can be configured to reduce a magnitude of the input current through the primary winding in response to detecting the overload condition associated with the output voltage.

As discussed herein, a method includes: controlling input current through a primary winding of a transformer, a secondary winding of the transformer magnetically coupled to the primary winding, the secondary winding operative to produce an output voltage based on the input current through the primary winding; operating in a first operating mode; operating in a second operating mode different than the first operating mode; monitoring a magnitude of an auxiliary voltage received from an auxiliary winding magnetically coupled to the secondary winding; and detecting an overload condition associated with the output voltage based on the magnitude of the auxiliary voltage received from the auxiliary winding and a mode of operating the controller.

Detecting the overload condition may include: comparing the magnitude of the auxiliary voltage to a threshold level; and determining occurrence of the overload condition based on the magnitude of the auxiliary voltage being below the threshold level during a control condition in which the controller implements the first operating mode of controlling the input current for a predetermined time duration.

In one example, the overload condition is an overcurrent condition of the output voltage supplying an output current to a load.

The first operating mode may be a continuous operational mode of controlling switches coupled to the primary winding. Control of the switches controls a magnitude of the input current through the primary winding.

In accordance with another example, an apparatus as discussed herein includes: a controller operative to: control input current through a primary winding of a transformer, a secondary winding of the transformer magnetically coupled to the primary winding, the secondary winding operative to produce an output voltage based on the input current through the primary winding; monitor a magnitude of input current through the primary winding; monitor a magnitude of an auxiliary voltage received from an auxiliary winding magnetically coupled to the primary winding; and monitor for overload conditions associated with the output voltage based on: i) the magnitude of the input current through the primary winding, and ii) the magnitude of the auxiliary voltage received from the auxiliary winding.

The controller is further operative to detect a first overload condition associated with output voltage based on the magnitude of the input current through the primary winding being above a current threshold value during a first output voltage mode of operating a load powered by the output voltage; and wherein the controller is further operative to detect a second overload condition associated with output voltage based on the magnitude of the auxiliary voltage received from the auxiliary winding being less than a voltage threshold level during a second output voltage mode of operating the load powered by the output voltage.

In accordance with still further examples, the load is circuitry powered by the output voltage. A user controls operation of the circuitry between the first output voltage mode and the second output voltage mode.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium and/or any computer readable hardware storage medium on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices or processing hardware) to: control input current through a primary winding of a transformer, a secondary winding of the transformer magnetically coupled to the primary winding, the secondary winding operative to produce an output voltage based on the input current through the primary winding; operating in a first operating mode; operate in a second operating mode different than the first operating mode; monitor a magnitude of an auxiliary voltage received from an auxiliary winding magnetically coupled to the secondary winding; and detect an overload condition associated with the output voltage based on the magnitude of the auxiliary voltage received from the auxiliary winding and a mode of operating the controller.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting switching power supplies. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

The foregoing and other objects, features, and advantages of the embodiments herein will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Figure 1:
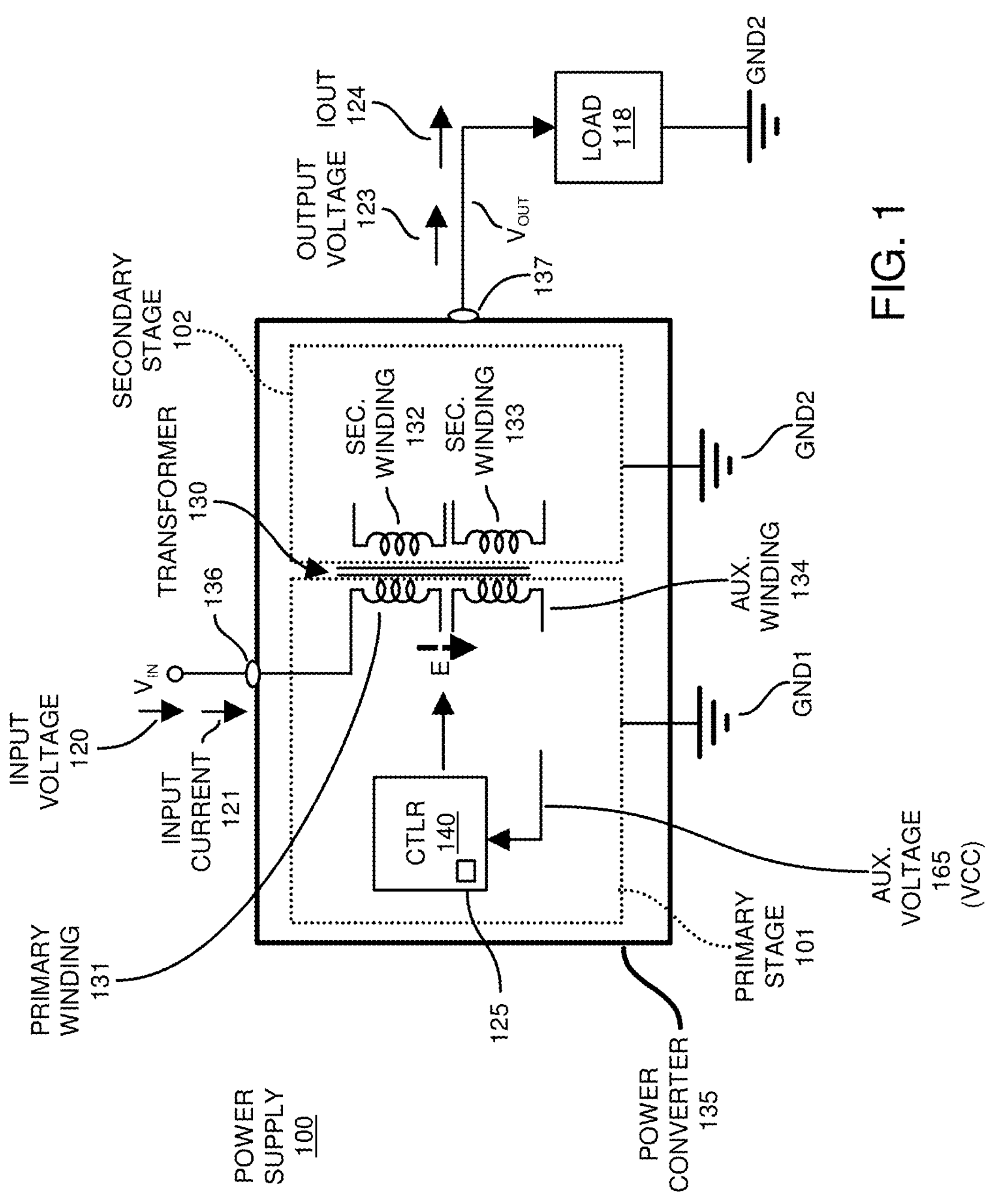
FIG. 1 is an example general diagram of a power supply implementing overload protection as discussed herein.

Now, more specifically, FIG. 1 is an example general diagram of a power supply supporting over-load protection according to embodiments herein.

As shown in this example, the power supply 100 (such as an apparatus) includes power converter 135 (a.k.a., voltage converter) powering the load 118. The power converter 135 includes a primary stage 101 (such as associated with a primary side of the power supply 100) and a secondary stage 102 (such as associated with a secondary side of the power supply 100).

As further shown, the power converter 135 includes a controller 140 and a transformer 130. Transformer 130 includes one or more windings such as primary winding 131, auxiliary winding 134, and one or more secondary windings such as secondary winding 132, secondary winding 133, etc. Thus, the primary stage 101 includes primary winding 131, controller 140, auxiliary winding 134, and corresponding control circuitry 125. Secondary stage 102 includes secondary windings 132 and 133 as well as additional circuitry to at least produce the output voltage 123.

Controller 140 can be configured to include control circuitry 125 operable to control operation of the power supply 100 in different operational modes (such as so-called burst mode or non-burst mode). As further discussed herein, the control circuitry 125 can be configured to provide any of one or more functions such as output voltage regulation, overload protection with respect to the output voltage 123 and output current IOUT 124, etc.

During normal operation, to regulate a magnitude of the output voltage 123, the controller 140 controls a flow of input current 121 through the primary winding 131 of transformer 130. Energy E associated with the input current 121 from input voltage 120 through the primary winding 131 causes (induces) current to flow in each of the secondary windings 132 and 133 as well as the auxiliary winding 134.

Based on transfer of energy E via transformer 130, one or more of the secondary windings 132, 133, etc., produce a respective output voltage 123 (VOUT) and corresponding output current IOUT 124 from port 137 of power converter 135 that powers the load 118. Further note that, based on a portion of the energy E from the primary winding 131 to the auxiliary winding 134, the auxiliary winding 134 produces auxiliary voltage 165 such as signal VCC used to power the controller 140 and/or corresponding circuitry in the primary stage 101.

As further discussed herein, during a so-called PSON mode or PSOFF mode, the controller 140 and corresponding circuitry 125 can be configured to prevent a magnitude of the output current IOUT 124 associated with the output voltage 123 from raising above a threshold level to protect the load 118 from damage or damage to the voltage converter 135. These different modes (PSON mode or PSOFF mode) are discussed below.

Figure 2:
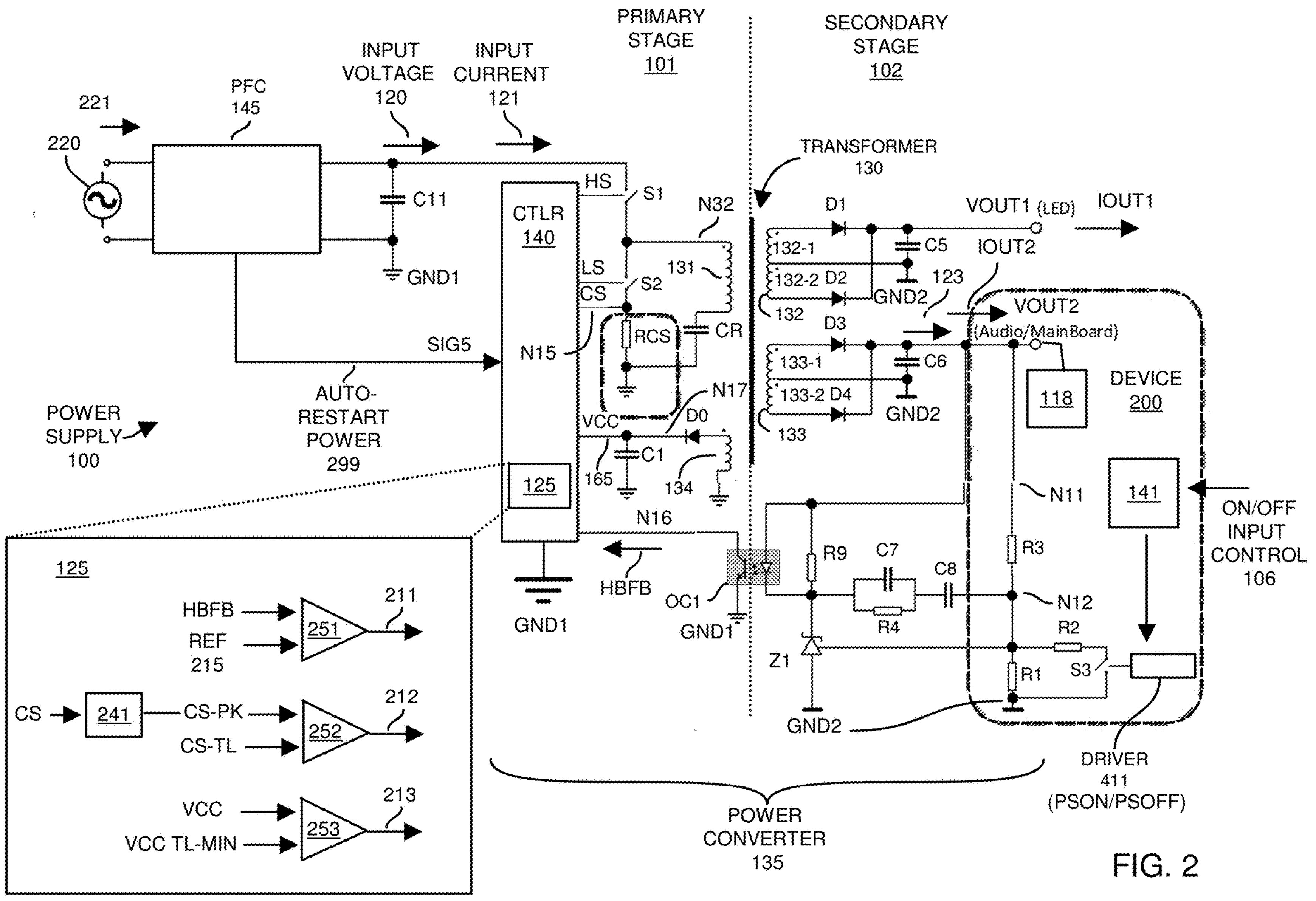
FIG. 2 is a detailed diagram illustrating details of an example power supply implementing overload protection as discussed herein.

FIG. 2 is an example detailed diagram illustrating details of an example power supply as discussed herein.

In this more detailed example of power supply 100, the power converter 135 includes power factor correction module 145, capacitor C11, controller 140, high side switch circuitry S1, low side switch circuitry S2, resistor RCS, capacitor CR, capacitor C1, diode D0, opto-coupler OC1, diode D1, diode D2, diode D3, diode D4, capacitor C5, capacitor C6, resistor R9, resistor R4, component Z1, capacitor C7, capacitor C8, resistor R1, resistor R2, resistor R3, switch S3, switch driver 411, load 118, signal generator 141, etc.

The PFC module 145 converts an input voltage 221 (such as an AC voltage, 90-260 VAC or other suitable value) received from source 220 into the input voltage 120 (such as approximately DC voltage, 400 VDC or any suitable magnitude).

As previously discussed, the transformer 130 includes primary winding 131 (having N1 turns), secondary winding 132 (having N2 turns), secondary winding 133 (having N3 turns), and auxiliary winding 134 (having N4 turns), where N1, N2, N3, and N4 are any suitable values.

Each of the windings associated with the transformer 130 are magnetically coupled to each other. For example, as previously discussed, the secondary winding 132 and winding 133 are magnetically coupled to receive magnetic energy E from the primary winding 131. The auxiliary winding 134 is also magnetically coupled to receive magnetic energy E from the primary winding 131.

In this example, the first output stage of the power converter 135 includes secondary winding 132 (such as winding 132-1 and winding 132-2), diode D1, diode D2, and output capacitor C5 (that stores output voltage VOUT1). Via the magnetic energy E received from the primary winding 131, the combination of the secondary windings 132-1 and 132-2 and the diode D1 and diode D2 (rectifying diodes) produce the output voltage VOUT1 and corresponding output current IOUT1 such as to power a first load such as light emitting hardware such as one or more LEDs (Light Emitting Diode or other suitable entity).

A second output stage of the power converter 135 includes secondary winding 133 (such as winding 133-1 and winding 133-2), diode D3, diode D4, and output capacitor C6 (which stores output voltage 123 or voltage VOUT2). Via the magnetic energy E received from the primary winding 131, the combination of the secondary windings 133-1 and 133-2 and the diode D3 and diode D4 (rectifying diodes) produce the output voltage VOUT2 (a.k.a., output voltage 123 such as a DC voltage) and corresponding output current IOUT2 to power a respective load 118 and/or any circuit components associated with device 200. As further discussed herein, the device 200 and/or load are operated in a so-called PSON mode (regulation of VOUT2 at 12 VDC) or a PSOFF mode (regulation of VOUT2 at 8 VDC).

Node N16 of the controller is pulled up. A high voltage of HBFB indicates that the magnitude of the output voltage 123 is decreasing.

In general, the controller 140 provides regulation of the output voltages including regulation of the output voltage 123 via control of a magnitude and timing of input current 121 through the primary winding 131. More specifically, the controller 140 receives feedback signal HBFB from the optical coupler OC1. The magnitude of the feedback signal HBFB (and amount of current associated with HBFB signal pulled to ground GND1) depends at least in part on multiple parameters such as a magnitude of the output voltage 123 (VOUT2) and the PSON/PSOFF setting of the device 200 (main circuit board such as load 118) as controlled by the signal 106.

For example, assume that the control signal 106 selects operation of the device 200 to the so-called PSON mode. In such an instance, the power supply 100 regulates the output voltage 123 to a magnitude of around 12 VDC or other suitable value. In the PSON mode, the driver control circuit 141 controls the driver 411 and corresponding switch S3 to the ON state. This places resistor R1 and resistor R2 in parallel with each other (such as resistance R1PR2=(R1×R2)/(R1+R2) between node N12 and ground GND2, reducing the overall resistance between node N12 and reference node GND2. The voltage at node N12 contributes to producing feedback signal HBFB (such as amount of current sunk to ground reference GND1). The voltage at node N12 (VN12) is based on a magnitude of the output voltage 123 and a ratio:

$$VN12 = VOUT2 \times [R1PR2 \times (R3 + R1PR2)].$$

As previously discussed, the magnitude of the feedback signal HBFB is proportional to the magnitude of the output voltage 123.

Thus, the feedback generator (such as one or more of resistors R1, R2, R3, operative to-coupler OC1, resistor R9, capacitor C8, Capacitor C7, resistor R4, resistor R9, component Z1, etc.) in the circuitry of device 200 adjusts the feedback signal HBFB depending on setting of the circuit to the PSON mode versus the PSOFF mode. Selection of the PSON mode results in the controller 140 producing the output voltage 123 at a first magnitude (higher voltage such as 12 VDC); selection of the PSOFF mode resulting in the controller 140 producing the output voltage 123 at a second magnitude (such as 8 VDC, lower voltage providing better efficiency).

To provide regulation with respect to generating the output voltage 123, the controller 140 implements a comparator 251 to compare the feedback signal HBFB to the setpoint reference voltage 215. When the signal HBFB exceeds a magnitude of the reference voltage 215, the controller 140 generates control signal HS to an ON-state for an amount of time to increase the amount of energy inputted to the primary winding and corresponding resonant circuit path including primary winding 131 and capacitor CR. In one example, based on controlled switching of switches S1 and S2 associated with the resonant circuit path (namely, primary winding 131 and the capacitor CR), the controller 140 controls a magnitude of the output voltage 123 to be around 12 VDC (or other suitable value) to power respective device 200 and corresponding load 118 when the device 200 is switched to the PSON mode (a.k.a., state) by a respective user.

Note that regulation of the output voltage 123 can be achieved in a number of different ways. For example, the controller 140 can be configured to operate the switches S1 and S2 in a so-called non-burst mode (a.k.a., first operating mode, continuous mode, etc.) for higher output current IOUT2 conditions. The non-burst mode is a condition in which the current through the primary winding is non-zero through the entire control cycle of switching switches S1 and S2. In such an instance, the switch S1 is ON and the switch S2 is OFF for a first portion of a respective control cycle; conversely, the switch S2 is ON and the switch S1 is OFF for a second portion of the respective control cycle. Thus, in the continuous non-burst mode, switch S1 is ON when the switch S2 is OFF; the switch S2 is ON when the switch S1 is OFF. The duty cycle of the first portion of the respective control cycle with respect to the second portion of the site respective control cycle during the continuous mode may be the same or vary depending upon the magnitude of the output current 124. Other than dead time in which both switches are temporarily OFF during a switch transition of a respective control cycle, either switch S1 is ON or switch S2 is ON in each respective control cycle while the controller 140 operates in the non-burst mode.

For lower magnitudes of the output current IOUT2, the controller 140 can be configured to operate in a so-called burst mode (a.k.a., second operating mode, etc.) in which the switch S1 is turned on one or more times for short durations during a first portion of a respective control period (such as including multiple control cycles) while switches S1 and S2 are simultaneously off for a second portion of the respective control period. The activation of the switch S1 and/or switch S2 in the burst mode in multiple cycles provides sufficient current to maintain the magnitude of the output voltage 123 to a desired setpoint value. In the burst mode, the current 121 through the primary winding 131 generally reduces to substantially zero and stays at zero until the next burst of pulses in the control period.

As previously discussed, controlled flow of the input current 121 results in generation of the output voltages VOUT1 and VOUT2.

As discussed herein, monitoring of the signal HBFB enables the controller 140 to regulate a magnitude of the output voltages during the PSON mode. For example, the controller 140 monitors operation of the voltage CS at node N15 to prevent an overload condition during the PSON mode. For example, circuit 125 includes peak voltage generator 241 to generate a peak current CS-PK signal, which is compared to a threshold level (threshold value) CS-TL via comparator 252 to detect an overload condition during the PSON mode.

Note further that the circuit 125 includes comparator 253 to compare the signal VCC (165) to a threshold value VCC TL-MIN to determine an overload condition when the power supply is operated in the PSOFF mode. Additional details of monitoring the VCC signal (generated from the auxiliary winding 134) and detecting an overload condition are discussed below.

Figure 3A:
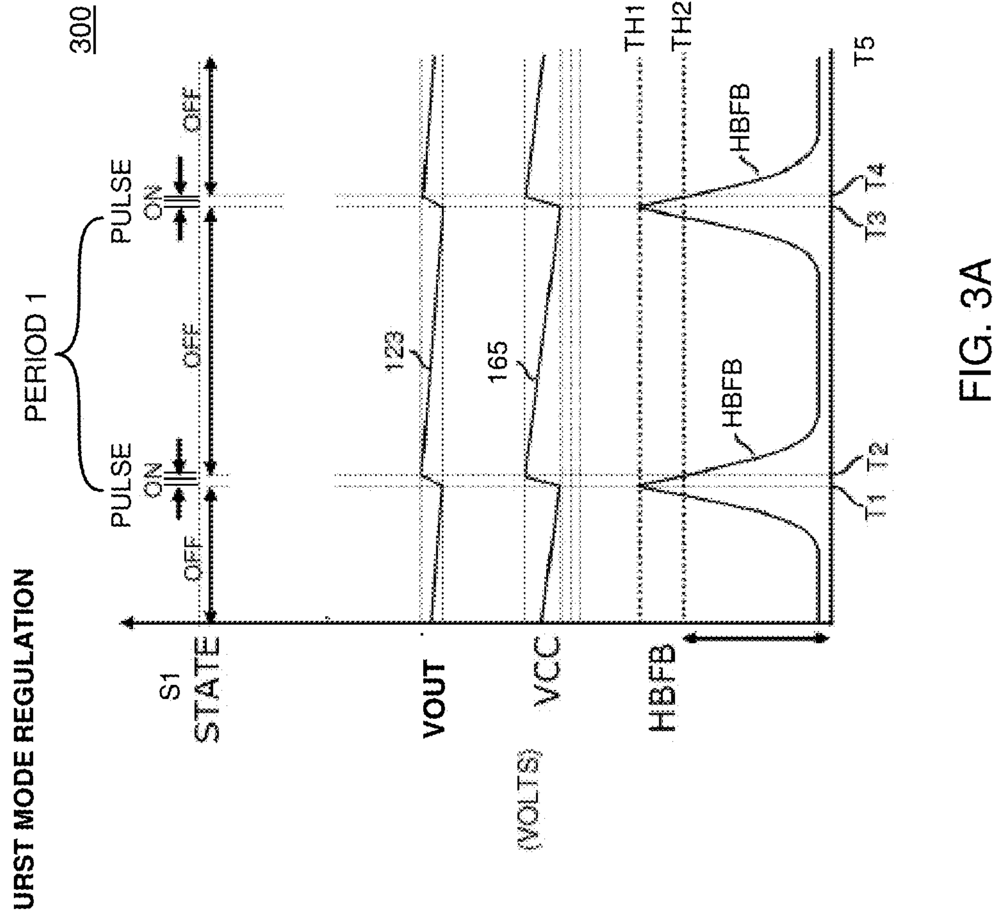
FIG. 3A is an example detailed timing diagram illustrating output voltage regulation during burst mode as described herein.

FIG. 3 is an example detailed timing diagram illustrating output voltage regulation during a low current consumption (either in the PSON mode or the PSOFF mode) as described herein.

Graph 300 illustrates control of conveying energy from the primary winding 131 to the secondary windings 133 to maintain the magnitude of the output voltage 123.

During the so-called burst mode or discontinuous operational mode (such as between time T1 and time T5) in which the load 118 consumes power from the output voltage 123, the magnitude of the voltage 165 (VCC) is operable to ratiometrically track the magnitude of the output voltage 123 depending on a number of turns in the windings of the transformer 130.

As previously discussed, the controller 140 receives the feedback HBFB from the secondary stage 102. Specifically, in this example, the controller 140 receives the feedback signal HBFB.

As shown, in response to detecting that a magnitude of the signal HBFB increases to a threshold value TH1 at time T1, the controller 140 initiates repeated ON/OFF switching of the switches S1 and S2 in multiple control cycles between or around time T1 and T2. As previously discussed, during activation of switch circuitry S1 in a respective control cycle, switch S1 is controlled ON by the controller 140 when switch S2 is OFF for a first portion (between T1 and T2) of the control period 1 (between T1 and T3); switch S1 is controlled OFF when switch S2 is controlled ON in the respective control period 1. Thus, the control signal HS and control signal LS between time T1 and T2 can include one or more repeated pulses (such as high and low side burst pulses) depending on the embodiment. Note that, for each control cycle in period 1, during so-called dead-times, the switch S1 is never ON at the same time that switch S2 is ON.

As further shown, burst mode activation of one or more of the switches S1 and S2 in a manner as previously discussed at different times between time T1 and T2 in period 1 (each period being similar) causes both the output voltage 123 to increase in magnitude as well as causes an increase in the magnitude of the voltage 165 (Vcc) during non-overload conditions. Between time T2 and time T3, the controller 140 simultaneously controls the switches S1 and S2 to OFF states.

Figure 3B:
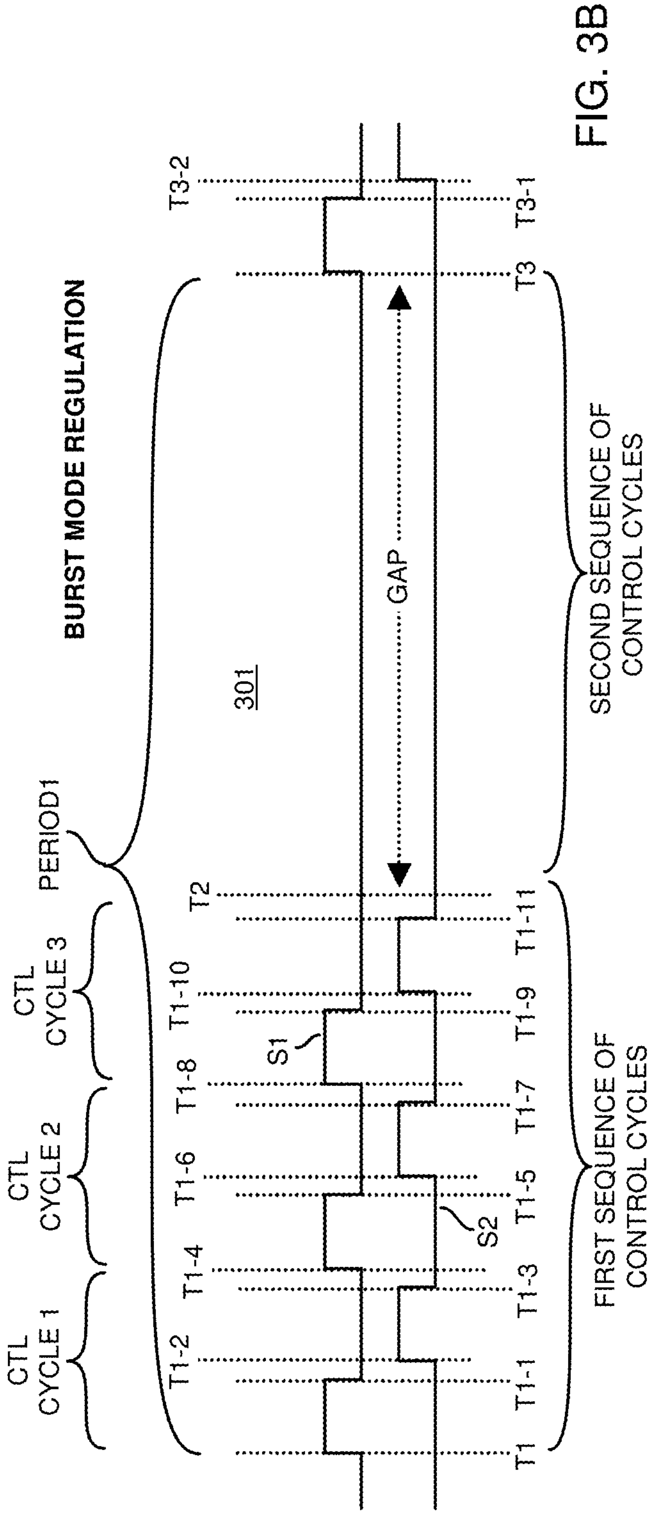
FIG. 3B is an example detailed timing diagram illustrating output voltage regulation during burst mode as described herein.

Additional details of controlling switches S1 and S2 is shown timing diagram 310 in FIG. 3B. In this example, the first sequence of control cycles includes a first control cycle between time T1 and T1-4, a second control cycle between time T1-4 and T1-8, a third control cycle between time T1-8 and T2.

The period 1 (major cycle) can include any number of control cycles (3 in this example) in the burst mode. For example, in the first control cycle between time T1 and T1-4, the controller 140 activates switch S1 ON between time T1 and T1-1 while switch S2 is OFF; the controller 140 activates switch S2 ON between time T1-2 and T1-3 while switch S1 is OFF; the controller 140 implements dead time between time T1-1 and T1-2 as well as between time T1-3 and T1-4. In the second control cycle between time T1-4 and T1-8, the controller 140 activates switch S1 ON between time T1-4 and T1-5 while switch S2 is OFF; the controller 140 activates switch S2 ON between time T1-6 and T1-7 while switch S1 is OFF; the controller 140 implements dead time between time T1-5 and T1-6 as well as between time T1-7 and T1-8. In the third control cycle between time T1-8 and T2, the controller 140 activates switch S1 ON between time T1-8 and T1-9 while switch S2 is OFF; the controller 140 activates switch S2 ON between time T1-10 and T1-11 while switch S1 is OFF; the controller 140 implements dead time between time T1-9 and T1-10 as well as between time T1-11 and T2.

Thus, controller 140 controls operation of the switches S1 and S2 in the burst mode includes switching of the multiple switches ON and OFF in a first sequence of multiple control cycles between time T1 and time T2 of the period 1 followed by simultaneous deactivation of the multiple switches in a second sequence of multiple control cycles or time duration (i.e. in a break) such as between time T2 and time T3 of the period 1. Each period of operating in the burst mode includes a first portion in which the switches S1 and S2 are turned ON and OFF and a second portion (such as gap) in which switches S1 and S2 are always both simultaneously OFF. For a first set of switch control cycles of switching the multiple switches S1 and S2 ON and OFF between time T1 and time T2, the magnitude of the input current 121 through the primary winding 131 increases and the magnitude of the output voltage 123 increases. Conversely, for a second set of switch control cycles or time duration between T2 to T3 of simultaneously deactivating the multiple switches of period 1 for the time duration between T2 and T3, the magnitude of the input current 121 through the primary winding decreases and the magnitude of the output voltage decreases.

Referring again to FIG. 3A, in a similar manner as previously discussed, during the burst mode, between time T3 and T4, based on received feedback signal HBFB at node N16, the controller 140 initiates activation of the control switch circuitry 125 to an ON state via pulsing of one or more of the control signal HS and control signal LS to ON states between time T3 and T4.

Thus, in extremely light load conditions and low magnitude of the output current IOUT, the controller 140 operates the switches S1 and S2 in a burst mode, meaning the gate drivers of switches S1 and S2 are driven at a lower frequency ranges and switching on periodically only to maintain the supply voltage and the VCC of the device as well as to produce the output voltage 123.

Figure 3C:
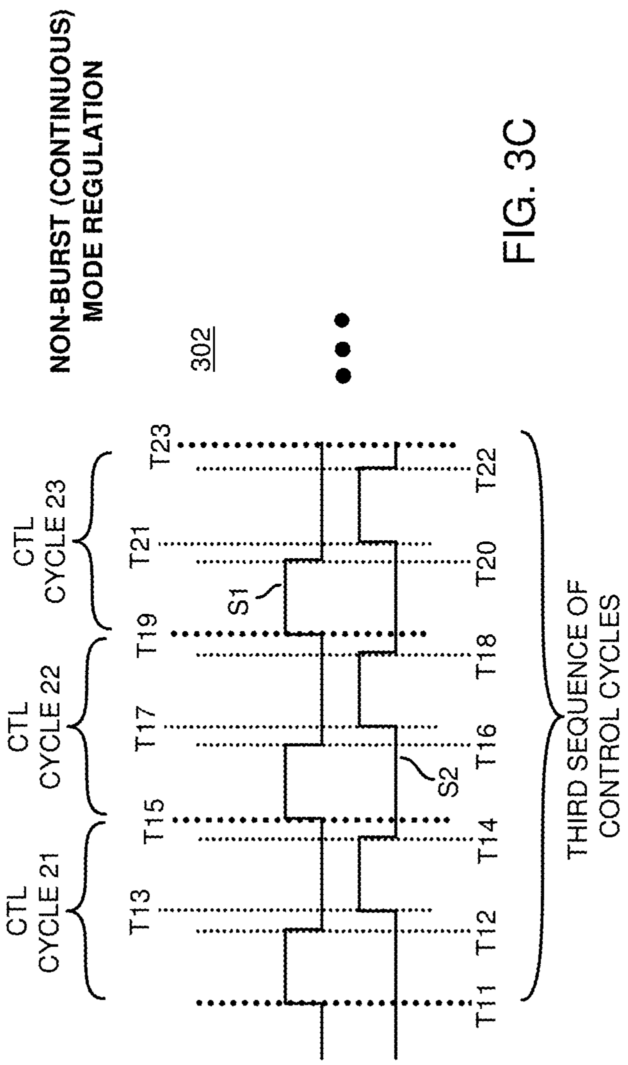
FIG. 3C is an example detailed timing diagram illustrating output voltage regulation during non-burst (continuous) mode as described herein.

In contrast to burst mode operation, during heavier load conditions, as shown in FIG. 3C, note that the controller 140 can be configured to operate in a so-called continuous mode (a.k.a., non-burst mode). For example, operation in the non-burst mode for a time duration includes switching of the multiple switches ON and OFF (same as operation between time T1 and time T2) without any break (such as T2 to T3) of simultaneously deactivating both switches S1 and S2 for a complete portion of a cycle.

More specifically, with reference to FIG. 3C, operation of the switches S1 and S2 in the non-burst mode (continuous mode) includes: i) in the first control cycle (21) between time T11 and T15, the controller 140 activates switch S1 ON between time T11 and T12 while switch S2 is OFF; the controller 140 activates switch S2 ON between time T13 and T14 while switch S1 is OFF; the controller 140 implements dead time between time T12 and T13 as well as between time T14 and T15; ii) in the second control cycle (22) between time T15 and T19, the controller 140 activates switch S1 ON between time T15 and T16 while switch S2 is OFF; the controller 140 activates switch S2 ON between time T17 and T18 while switch S1 is OFF; the controller 140 implements dead time between time T16 and T17 as well as between time T18 and T19; iii) in the third control cycle (23) between time T19 and T23, the controller 140 activates switch S1 ON between time T19 and T20 while switch S2 is OFF; the controller 140 activates switch S2 ON between time T21 and T22 while switch S1 is OFF; the controller 140 implements dead time between time T20 and T21 as well as between time T22 and T23; and so on.

Figure 4:
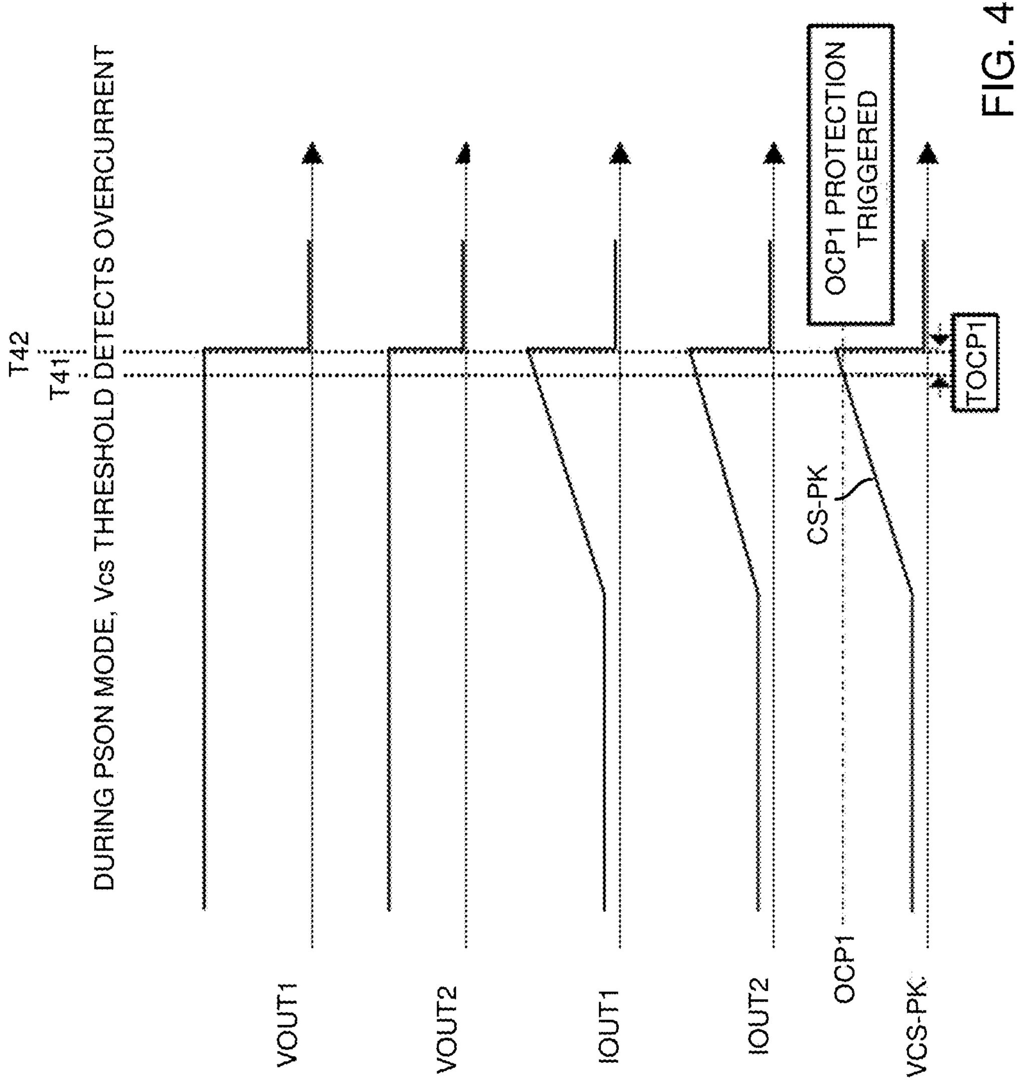
FIG. 4 is an example timing diagram illustrating detection of an overcurrent condition and implementation of overload protection during the PSON mode as discussed herein.

FIG. 4 is an example timing diagram illustrating detection of an overcurrent condition during the PSON mode as discussed herein.

With reference to FIG. 2 and FIG. 4, while in the PSON mode of the device and corresponding being powered by 12 VDC (or other suitable value), the controller 140 implements a respective circuit function in circuit 125 to prevent a respective overcurrent condition associated with producing output current IOUT2 provided to power the device 200 and corresponding circuitry.

For example, the controller 140 can be configured to monitor a magnitude of the voltage CS at node N15 when the switch S2 is ON (closed) and S1 is OFF (opened) to prevent an overload condition on the secondary side of the power supply 100. More specifically, to this end, the peak voltage generator 241 receives the CS signal and generates the corresponding CS-PK signal indicating a peak voltage of the signal CS for one or more control cycles of monitoring a magnitude of the in current 121 through the primary winding 131. The comparator 252 compares the signal CS-PK to the threshold level CS-TL to produce the corresponding output signal 212 indicating whether an overcurrent condition occurs associated with generation of the output current IOUT2 and/or IOUT1.

When the magnitude of the signal CS-PK is less than the threshold level CS-TL such as prior to time T41, the comparator 252 produces the output signal 212 to be a logic low indicating no overcurrent (overload) condition associated with the output current IOUT2. Conversely, when the magnitude of the signal CS-PK is greater than the threshold level CS-TL for a time duration of TOCP1 (such as time T42 minus time T41), the comparator 252 produces the output signal 212 to be a logic high indicating an overcurrent condition associated with the output current IOUT2. In such an instance, in response to detecting the overcurrent condition at or around time T42, the controller 140 reduces the amount of input current 121 through the primary winding 131. For example, the controller 140 can be configured to open both switch S1 and switch S2 to OFF states, which immediately causes the magnitude of the output voltages VOUT1 and VOUT2 to decrease in magnitude. Thus, FIG. 4 illustrates detection of an output current overload condition associated with the output current IOUT1 and/or IOUT2 while in the PSON mode. Opening of one or more of the switches S1 and S2 prevents damage to one or more components such as diodes D1, D2, D3, D4, device 200, dynamic load 118, etc.

Figure 5:
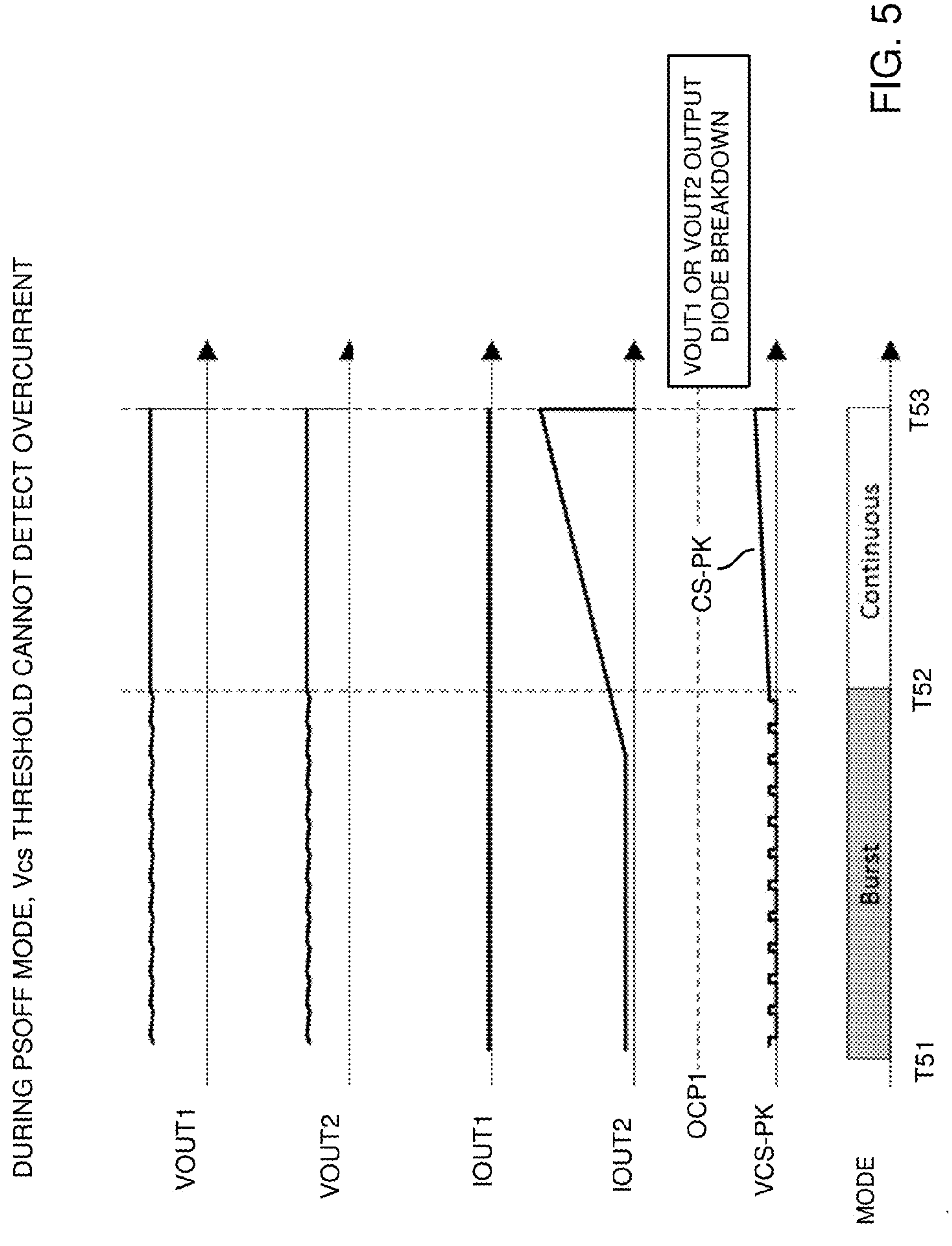
FIG. 5 is an example timing diagram illustrating a difficulty (or inability) of sensing an overload condition while monitoring a respective CS-PK (CS-Peak) signal during PSOFF as discussed herein.

FIG. 5 is an example timing diagram illustrating the inability to detect an overload condition via monitoring of a respective CS-PK (CS-Peak) signal to as discussed herein.

Assume that the control signal 106 selects operation of the device 200 to the so-called PSOFF mode. In such an instance, for better efficiency, the power supply 100 produces the output voltage 123 to be a magnitude of around 8 VDC or other suitable value. In the PSOFF mode, the driver control circuit 141 controls the driver 411 and corresponding switch S3 to the OFF-state (open state). This terminates resistor R1 and resistor R2 from being in parallel with each other. As previously discussed, the voltage at node N12 of the resistor divider R1 and R3 contributes to producing feedback signal HBFB. For example, during the PSOFF mode, the voltage at node N12 is VOUT2×[R1/(R1+R3)]. In a manner as previously discussed, the magnitude of the feedback signal HBFB is based on the magnitude of the output voltage 123.

Thus, a gain factor associated with the feedback signal HBFB varies depending on an ON mode (PSON mode, R1 in parallel with R2, first gain of circuit generating feedback HBFB) and OFF mode (PSOFF mode, R1 not in parallel with R2, second gain of circuit generating feedback HBFB) status of a circuit board (device 200) powered by the output voltage 123.

To provide regulation during the PSOFF mode, the controller 140 monitors feedback signal HBFB. Based on the feedback HBFB, in a similar manner as previously discussed, the controller 140 generates control signals HS and LS to increase or decrease the amount of energy inputted to the primary winding 131 and corresponding resonant circuit path including primary winding 131 and capacitor CR.

In this case as shown in FIG. 5, the controller 140 operates in a burst or discontinuous mode between time T51 and time T52. Based on monitoring of the signal CS-PK, the controller 140 is unable to detect an overload condition associated with IOUT1, IOUT2, VOUT1, VOUT2, etc., because the magnitude of the CS-PK signal associated with monitored signal CS does not raise above the OCP1 threshold level while attempting to regulate a magnitude of the output voltage 123 (VOUT2) to an appropriate magnitude of around 8 VDC. This is because of the gain change associated with the voltage divider R1, R2, and R3. In such an instance, at time T53, the diodes D3 D4 experience a respective breakdown and/or failure. This is an undesirable condition.

In other words, failure of the controller 140 to detect the overload condition associated with the output current IOUT2 being above a threshold value prior to damage occurring at time T53 (VOUT1 or VOUT2 output diode breakdown associated with one or more of diodes D1, D2, D3 and D4) is undesirable.

As further discussed herein, the controller 140 can be configured to implement a respective comparator 253 to determine a respective occurrence of an overload condition during the PSOFF mode to prevent damage to the power supply and corresponding one or more components in the secondary side.

For example, to detect the overload condition in the PSOFF mode, the controller 140 monitors a magnitude of the auxiliary voltage 165 (VCC) received from the auxiliary winding 134 magnetically coupled to the primary winding 131. The controller 140 detects an overload condition associated with the output voltage 123 based on the magnitude of the auxiliary voltage 165 received from the auxiliary winding 134. More specifically, via comparator 253, the controller 140 can be configured to detect the overload condition associated with the output current IOUT2 during the PSOFF mode based on the magnitude of the auxiliary voltage 165 (VCC signal at node N17) being below a threshold level (VCC TL-MIN) for greater than a particular time duration. In response to detecting the overload condition (such as over-voltage condition, over-current condition, etc.), the controller 140 can be configured to reduce a magnitude of the input current 121 inputted to the primary winding 131, preventing overload damage to the power converter circuit itself or components such as diodes D3 and D4 and/or damage to corresponding circuitry receiving the output voltage, output current, etc.

Thus, because the controller 140 in the primary side (primary stage) is unaware of whether the device 200 (main circuit board) is operated in the PSON mode or PSOFF mode, the controller 140 can be configured to monitor both signal CS at node N15 and corresponding signal CS-PK (signal 212) as well as monitor the magnitude of the signal VCC (165) at the node N17 such as based on output signal 213 of the comparator 253 to determine when the output current IOUT2 experiences an overload condition (over current condition).

Figure 6:
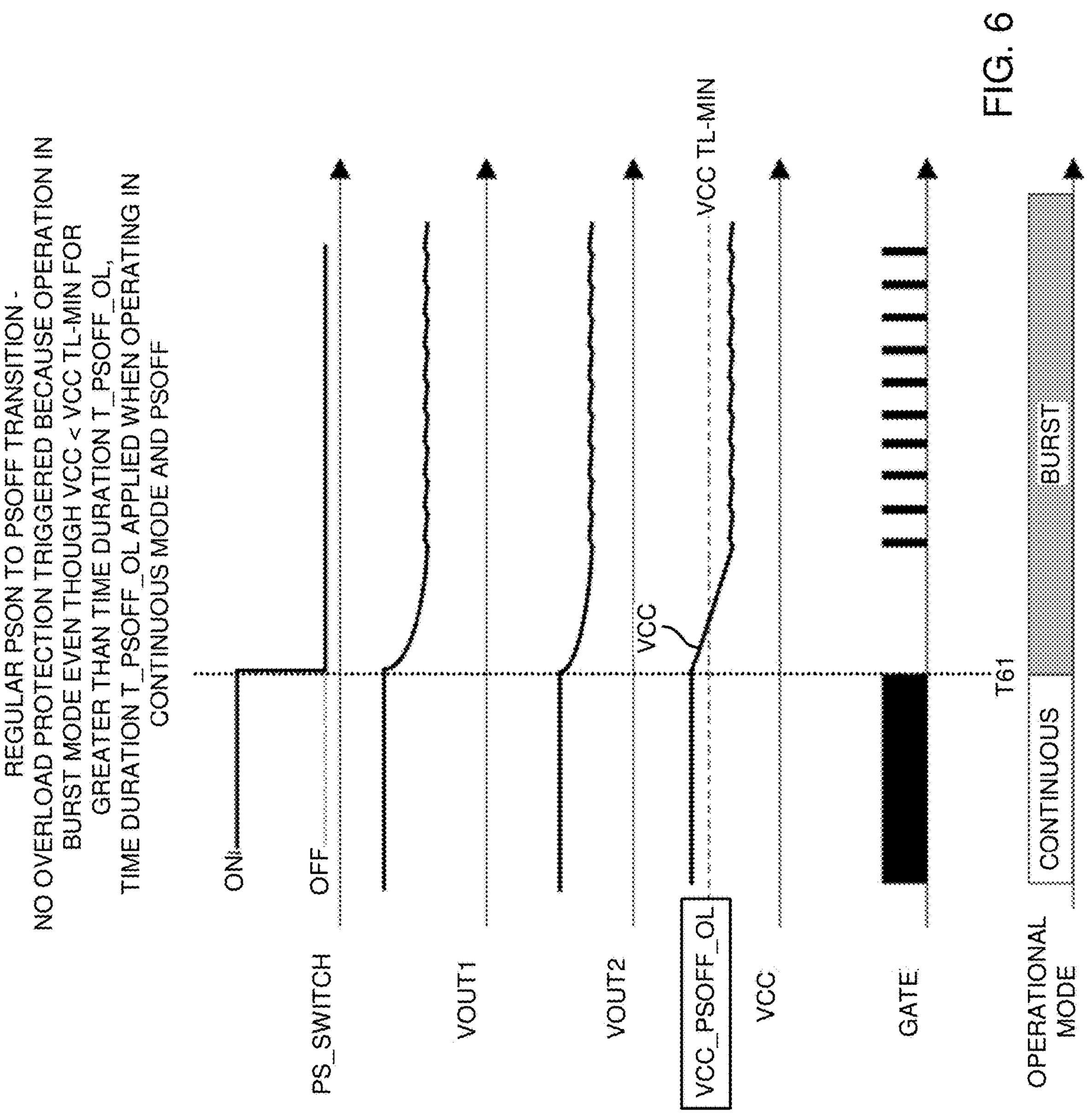
FIG. 6 is an example timing diagram illustrating a transition of operating from the PSON mode to the PSOFF mode of a power supply and the corresponding absence of triggering overload protection during a mode transition as described herein.

FIG. 6 is an example timing diagram illustrating a transition of operating from the PSON mode to the PSOFF mode and absence of implementing overload protection during a mode transition as described herein.

In this example, assume that the PSON and PSOFF control signal 106 indicates to switchover from operating in the PSON mode to the PSOFF mode at time T61. In such an instance, the controller 140 does not detect a respective overload condition after time T61 because the controller 140 operates in the burst mode to control switches S1 and S2 in a manner as previously discussed to produce the output voltage 123. In other words, during the burst mode, detection of the signal VCC being below the threshold value VCC TL-MIN does not trigger the overload condition and shut OFF of switches S1 and/or S2.

Figure 7:
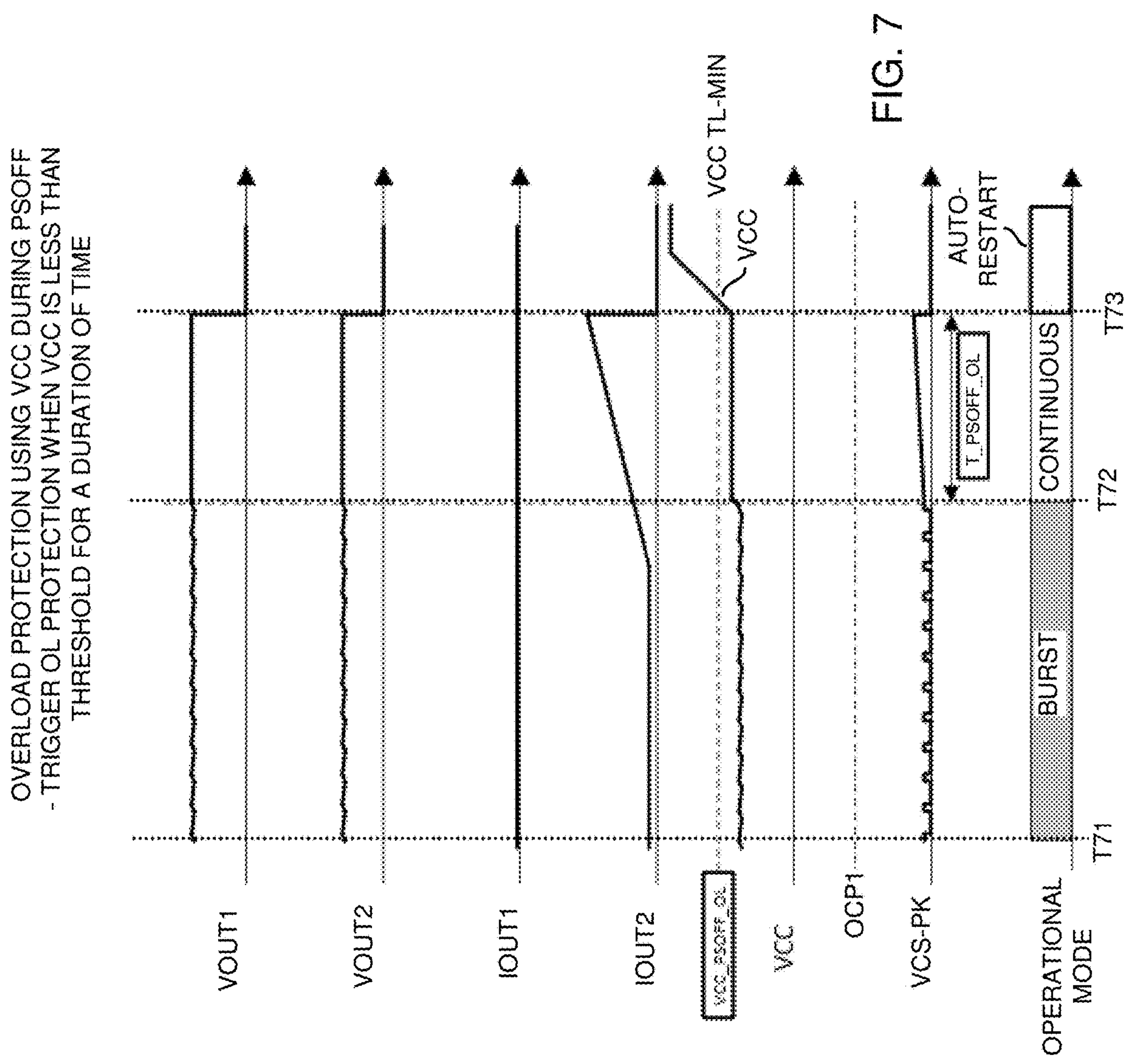
FIG. 7 is an example timing diagram illustrating triggering of overload protection when a VCC signal is less than a minimum threshold for a predetermined duration of time as discussed herein.

FIG. 7 is an example timing diagram illustrating triggering of overload protection when the VCC signal is less than a minimum threshold for a predetermined duration of time as discussed herein.

As previously discussed, to detect the overload condition in the PSOFF mode, the controller 140 also implements comparator 253 to monitor a magnitude of the auxiliary voltage 165 (VCC) received from the auxiliary winding 134 magnetically coupled to the primary winding 131. The controller 140 detects an overload condition associated with the output voltage 123 and/or output current IOUT2 based on the magnitude of the auxiliary voltage 165 (VCC) received from the auxiliary winding 134 and stored in capacitor C1.

More specifically, via comparator 253, the controller 140 can be configured to detect the overload condition associated with the output current IOUT2 based on the magnitude of the auxiliary voltage 165 (VCC signal at node N17) being below a threshold level (VCC TL-MIN) for greater than a particular time duration (T_PSOFF-OL). In response to detecting the overload condition (such as over-voltage condition, over-current condition, etc.), the controller 140 can be configured to reduce a magnitude of the input current 121 inputted to the primary winding 131, preventing overload damage to the power converter 135 itself or components such as diodes D3 and D4 and/or damage to corresponding circuitry receiving the output voltage, output current, etc.

In one example, note that the controller 140 needs to be operating in the non-burst mode of switching switches S1 and S2 in order to trigger the overload condition based on the magnitude of the signal VCC at node N17 being less than the threshold value VCC TL-MIN for greater than duration T_PSOFF-OL. The controller 140 and corresponding comparator 253 detect this case based on the magnitude of the signal VCC being below the threshold value between time T72 and time T73.

As further shown, at or around time T73, in response to detecting the magnitude of the VCC signal at node N17 being less than the threshold value VCC TL-MIN for greater than duration T_PSOFF-OL, the power supply 100 and corresponding power converter 135 operate in a temporary shutdown mode where neither of switches S1 or S2 is turned ON and the magnitude of the input current 121 reduces such as to substantially zero. As previously discussed in FIG. 2, just after time T73, the power converter 135 operates in the auto-start mode to charge the capacitor C1. For example, application of voltage such as signal SIG5 (auto-restart power) to the controller 140 causes a flow of current through the controller 140 to the corresponding capacitor C1 to produce the signal VCC to power the controller 140 again.

Figure 8:
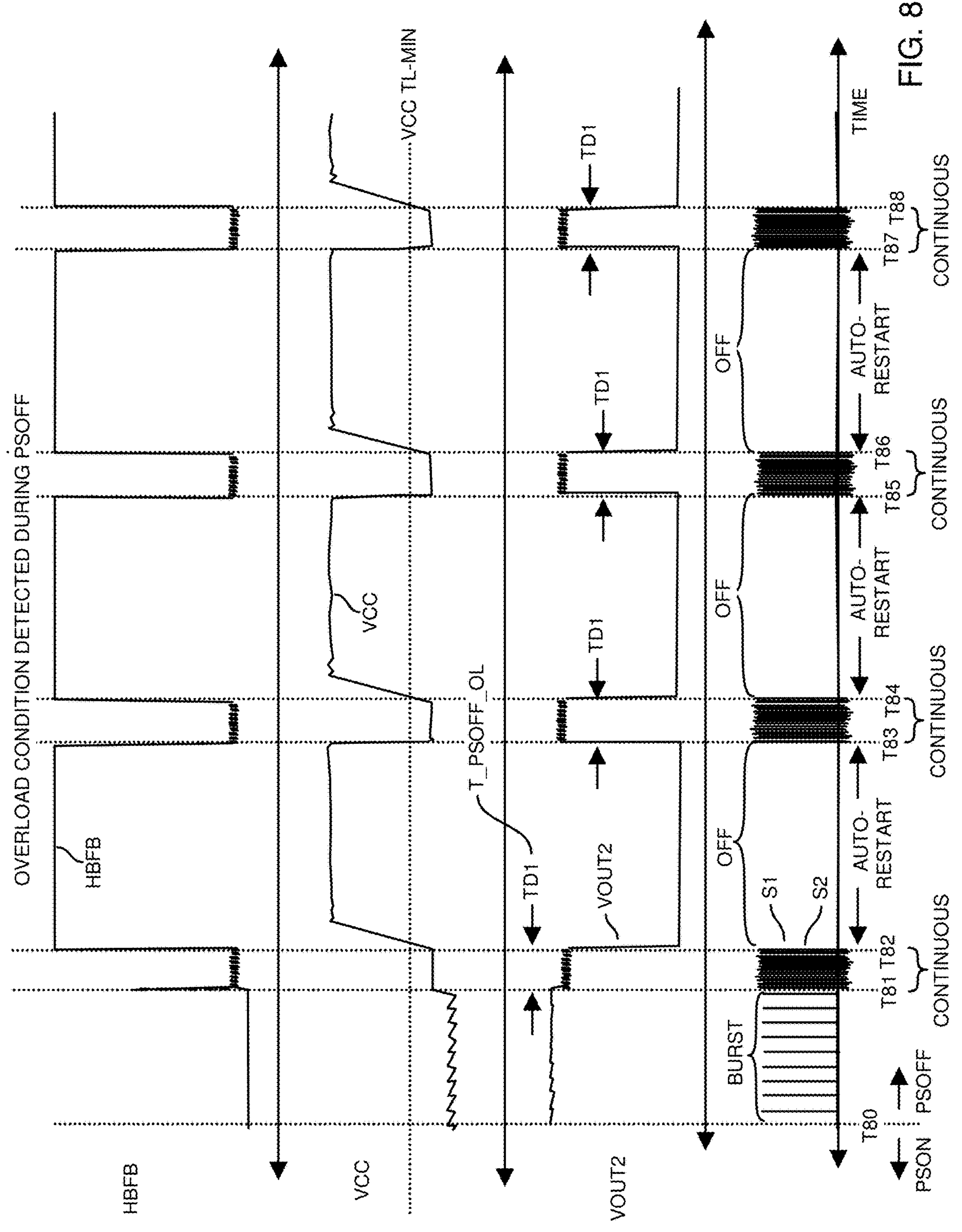
FIG. 8 is an example timing diagram illustrating operation of the power supply in a PSOFF mode and repeated triggering of overload protection and so-called auto-restart when a respective VCC signal is less than a minimum threshold for a predetermined duration of time as discussed herein.

FIG. 8 is an example timing diagram illustrating operation of the power supply in a PSOFF mode and repeated triggering of overload protection and so-called auto-restart when the VCC signal is less than a minimum threshold for a predetermined duration of time as discussed herein.

In this example, prior to time T80, the user provides control input 106 to operate in the PSON mode. During the PSON mode, and prior to time T80, the auxiliary winding 134 supplies current through the diode D0 to produce the voltage signal VCC.

At or around time T80, the user provides ON/OFF control input 106 to switch from the PSON mode to the PSOFF mode. In such an instance, the controller 141 controls the switch S3 to an ON-state prior to time T80 (PSON mode). Subsequent to time T80, the controller 141 controls the switch to an OFF-state (PSOFF mode) to at least time T88.

Between time T80 and time T81, the controller 140 operates the switches S1 and S2 in the so-called burst mode in a manner as previously discussed.

Between time T81 and time T82, the controller 140 operates the power converter 135 in the so-called continuous mode (non-burst mode) to maintain a magnitude of the output voltage 123 at a desired voltage such as 8 VDC. For example, in such an instance, between time T81 and time T82, for each of multiple control cycles, the controller 140 switches between activating the switch S1 to the ON-state (while switch S2 is in the OFF-state) and switching S2 to the ON-state (while switch S1 is in the OFF-state) operating in a resonant circuit mode to attempt to increase a magnitude of the output voltage 123 (VOUT2).

During this PSOFF mode, as previously discussed, the controller 140 implements comparator 253 to compare a magnitude of the signal VCC at node N17 to the threshold level VCC TL-MIN. The circuit 125 includes a timer 555 to time how long the signal VCC is less than VCC_TL_MIN. While in the PSOFF mode, in response to the timer 555 detecting a condition in which the magnitude of the signal VCC remains less than the threshold level VCC TL-MIN for an entire duration (between T81 and T82) greater than T_PSOFF-_OL (overload time) while the controller 140 controls switching of switches S1 and S2 in the non-burst mode, the controller 140 shuts off both switches S1 and S2 (in response to the detected overload condition) to prevent input current 121 from flowing through the primary winding 131.

More specifically, via the shut off of the switches S1 and S2 during the overload condition, the controller reduces a magnitude of the input current 121 to the primary winding. This shutdown of switches results in the controller 140 being temporarily operated in a standby mode in which the controller 140 does not activate either of the switch S1 or switch S2 between time T82 and time T83. In other words, during such time duration between time T82 and time T83 in the auto-restart mode, in a manner as previously discussed, the signal SIG5 (such as current or auto restart power 299 from the PFC 145) supplies current to the capacitor C1. Eventually, the received current causes the magnitude of the voltage VCC to raise to a sufficiently high magnitude that the controller 140 is then operated in the non-burst mode again at time T83.

Between time T83 and time T84, the controller 140 operates the power converter 135 in the so-called non-burst mode again to attempt to maintain a magnitude of the output voltage 123 at a desired voltage such as 8 VDC. For example, in such an instance, between time T83 and time T84, for each of multiple control cycles, the controller 140 switches between activating the switch S1 to the ON-state (while switch S2 is in the OFF-state) and switching S2 to the ON-state (while switch S1 is in the OFF-state) operating in a resonant circuit mode to attempt to increase a magnitude of the output voltage 123 (VOUT2). During this PSOFF mode, in a manner as previously discussed, the controller 140 implements comparator 253 to compare a magnitude of the signal VCC to the threshold level VCC TL-MIN. While in the PSOFF mode, in response to the timer 555 detecting a condition in which the magnitude of the signal VCC remains less than the threshold level VCC TL-MIN for an entire duration (between T83 and T84) greater than T_PSOFF_OL (overload time) while the controller 140 controls switching of switches S1 and S2 in the non-burst mode or continuous mode, the controller 140 shuts off both switches S1 and S2 (in response to the detected overload condition) to prevent input current 121 from flowing through the primary winding 131. This shutdown of switches results in the controller 140 being temporarily operated in a standby mode in which the controller 140 does not activate either of the switch S1 or switch S2 between time T84 and time T85. In other words, during such time between time T84 and time T85 in the auto-restart mode, in a manner as previously discussed, the signal SIG5 (such as current or auto restart power 299 from the PFC 145) supplies current to the capacitor C1. Eventually, the received current causes the magnitude of the voltage VCC to raise to a sufficiently high magnitude that the controller 140 is then operated in the continuous non-burst mode again to time T85.

Between time T85 and time T86, the controller 140 operates the power converter 135 in the so-called non-burst mode again to attempt to maintain a magnitude of the output voltage 123 at a desired voltage such as 8 VDC. For example, in such an instance, between time T85 and time T86, for each of multiple control cycles, the controller 140 switches between activating the switch S1 to the ON-state (while switch S2 is in the OFF-state) and switching S2 to the ON-state (while switch S1 is in the OFF-state) operating in a resonant circuit mode to attempt to increase a magnitude of the output voltage 123 (VOUT2). During this PSOFF mode, as previously discussed, the controller 140 implements comparator 253 to compare a magnitude of the signal VCC to the threshold level VCC TL-MIN. While in the PSOFF mode, in response to the timer 555 detecting a condition in which the magnitude of the signal VCC remains less than the threshold level VCC TL-MIN for an entire duration (between T85 and T86) greater than T_PSOFF-_OL (overload time) while the controller 140 controls switching of switches S1 and S2 in the non-burst mode, the controller 140 shuts off both switches S1 and S2 (in response to the detected overload condition) to prevent input current 121 from flowing through the primary winding 131. This shutdown of switches results in the controller 140 being temporarily operated in a standby mode in which the controller 140 does not activate either of the switch S1 or switch S2 between time T86 and time T87. In other words, during such time between time T86 and time T87 in the auto-restart mode, in a manner as previously discussed, the signal SIG5 (such as current or auto restart power 299 from the PFC 145) supplies current to the capacitor C1. Eventually, the received current causes the magnitude of the voltage VCC to raise to a sufficiently high magnitude that the controller 140 is then operated in the non-burst mode again.

Thus, via switches S1 and S2, the controller 140 is operative to control application of an input voltage 120 (such as switch S1 is ON) and a reference voltage (such as GND1) to the node N32 of the resonant circuit path (primary winding 131 in series with capacitor CR) of power converter 135 prior to detecting the overload condition to regulate a magnitude of the output voltage 123. The temporary shut off of the switches S1 and S2 (between time T82 and T83, between time T84 and time T85, between time T86 and time T87, etc.) and corresponding reduction of a magnitude of the input current 121 through the primary winding 131 in response to detecting the overload condition prevents damage to components in the power supply 100 such as diodes D1. D2, D3, D4, etc., in the event that node N21 or node N22 is shorted to ground or the device 200 experiences a short-circuit condition.

Accordingly, because the controller as discussed herein does not know what operational mode (PSON or PSOFF) is selected at the second side, the controller 140 monitor a magnitude of input current through the primary winding to determine an overload condition when the PSON mode is selected. Additionally, the controller 140 monitors a magnitude of an auxiliary voltage VCC received from an auxiliary winding 134 magnetically coupled to the primary winding 131.

Thus, to cover overload conditions associated with both possible modes (PSON and PSOFF) applied to the device 200, the controller 140 simultaneously monitors for overload conditions associated with the output voltage 123 based on: i) the magnitude of the input current 121 through the primary winding 131 (such as during a possible selection of the PSON mode) based on signal CS at node N15 and/or corresponding signal CS-PK>CS-TL, and ii) the magnitude of the auxiliary voltage 165 (VCC) at node N17 received from the auxiliary winding 134 and diode D0 (such as signal VCC less than VCC-TL for greater than a predetermined time duration while the controller 140 is in a continuous operational mode).

Figure 9:
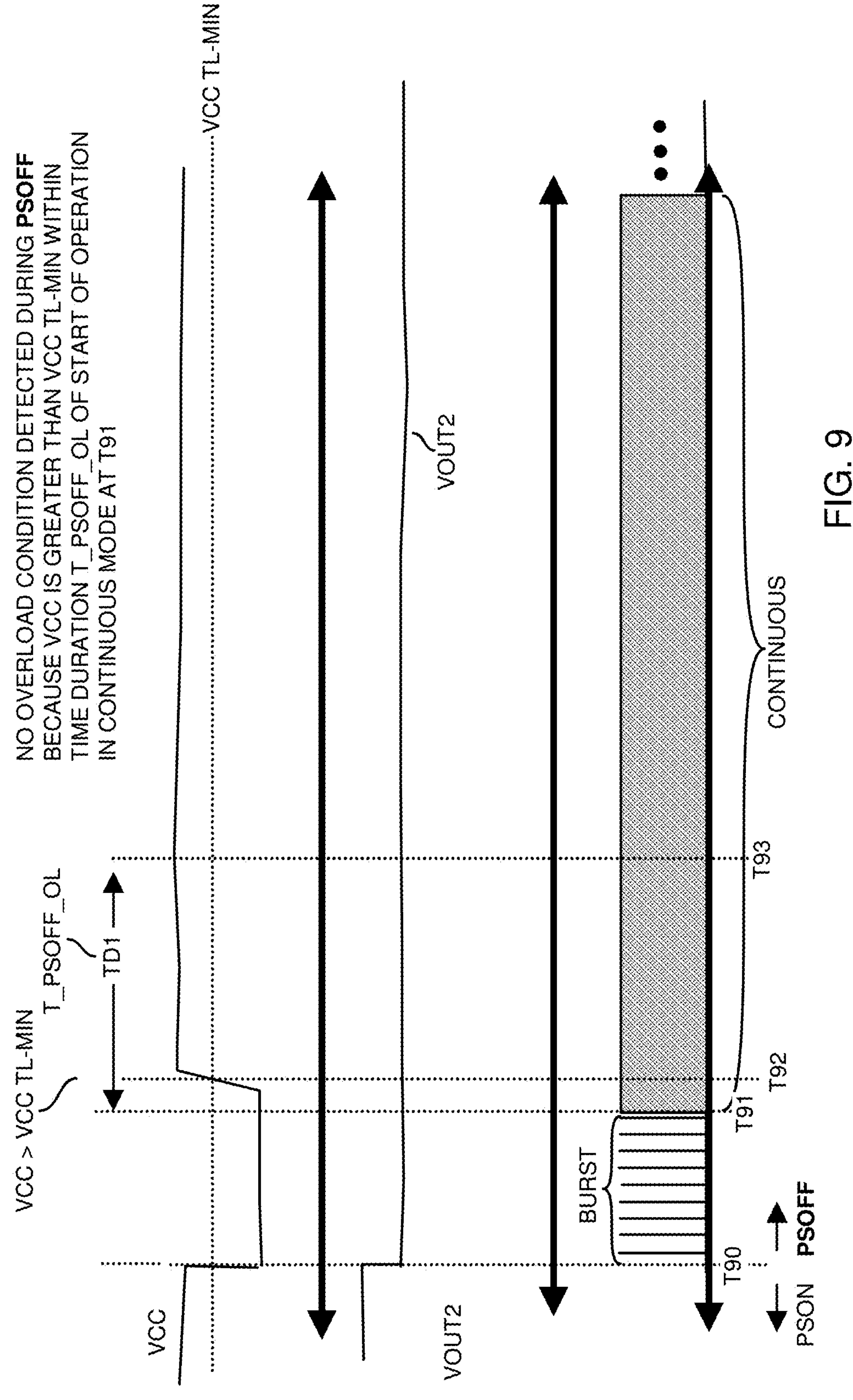
FIG. 9 is an example timing diagram illustrating operation of the power supply in a PSOFF mode and non-triggering of overload protection because a VCC signal is not below a minimum threshold for a predetermined duration of time as discussed herein.

FIG. 9 is an example timing diagram illustrating operation of the power supply in a PSOFF mode and non-triggering of overload protection when the VCC signal is not below a minimum threshold for a predetermined duration of time as discussed herein.

In this example, the power supply 100 is switched from the PSON mode to the PSOFF mode at time T90. The controller 140 controls switching of switches S1 and S2 between time T90 and T91 in the burst mode. At time T91, the controller 140 operates the switches S1 and S2 to regulate a magnitude of the output voltage 123 at a desired setpoint. Because there is no overload condition associated with the output voltage 123 or output current IOUT2 in the example of FIG. 9, the magnitude of the voltage VCC raises above the minimum threshold voltage level VCC TL-MIN prior to expiration of the time duration T_PSOFF_OL. In other words, the time duration between time T91 and T92 is less than time duration T_PSOFF_OL.

Figure 10:
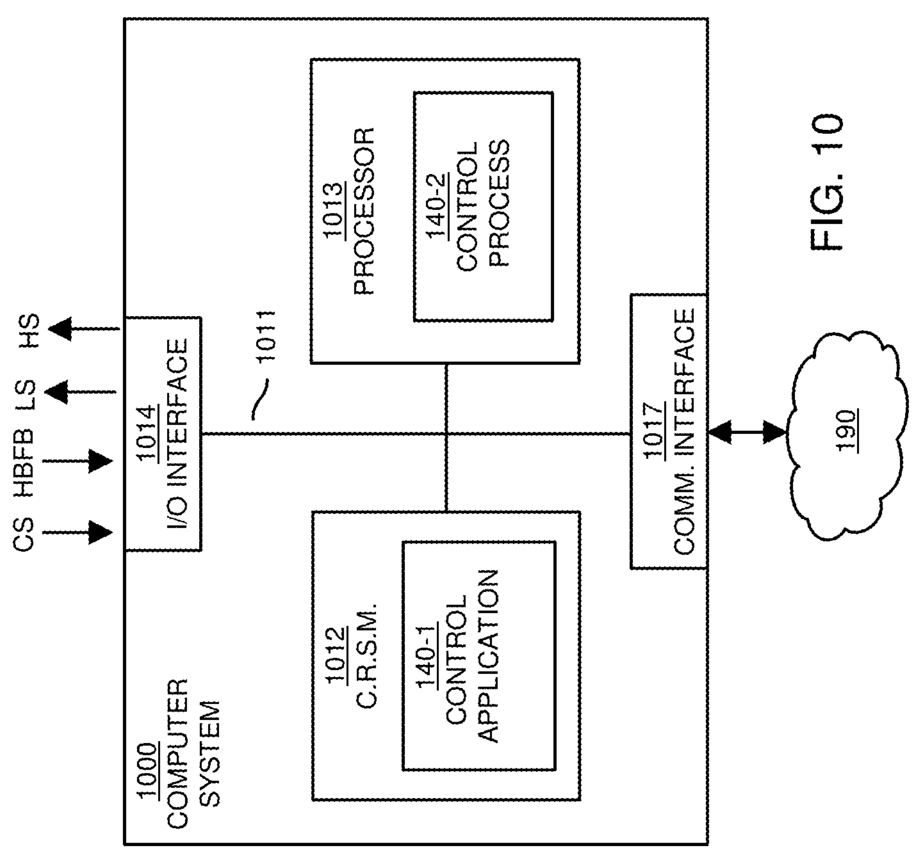
FIG. 10 is an example diagram illustrating computer processor hardware and related software instructions to execute one or more method as discussed herein.

FIG. 10 is an example diagram illustrating computer processor hardware and related software instructions to execute methods/operations according to embodiments herein.

As shown, computer system 1000 (such as implemented by any of one or more resources such as controller 140, over-voltage protection circuit 125, comparator 251, comparator 252, comparator 253, etc.) of the present example includes an interconnect 1011 that couples computer readable storage media 1012 such as a non-transitory type of media (or hardware storage media) in which digital information can be stored and retrieved, a processor 1013 (e.g., computer processor hardware such as one or more processor devices), I/O interface 1014, and a communications interface 1017.

I/O interface 1014 provides connectivity to any suitable circuitry such as power converter circuit 135.

Computer readable storage medium 1012 can be any hardware storage resource or device such as memory, optical storage, hard drive, floppy disk, etc. In one embodiment, the computer readable storage medium 1012 stores instructions and/or data used by the control application 140-1 to perform any of the operations as described herein.

Further in this example embodiment, communications interface 1017 enables the computer system 1000 and processor 1013 to communicate over a resource such as network 190 to retrieve information from remote sources and communicate with other computers.

As shown, computer readable storage media 1012 is encoded with control application 140-1 (e.g., software, firmware, etc.) executed by processor 1013. Control application 140-1 can be configured to include instructions to implement any of the operations as discussed herein.

During operation of one embodiment, processor 1013 accesses computer readable storage media 1012 via the use of interconnect 1011 in order to launch, run, execute, interpret or otherwise perform the instructions in control application 140-1 stored on computer readable storage medium 1012.

Execution of the control application 140-1 produces processing functionality such as control process 140-2 in processor 1013. In other words, the control process 140-2 associated with processor 1013 represents one or more aspects of executing control application 140-1 within or upon the processor 1013 in the computer system 1000.

In accordance with different embodiments, note that computer system 1000 can be a micro-controller device, logic, hardware processor, hybrid analog/digital circuitry, etc., configured to control a power supply and perform any of the operations as described herein.

Functionality supported by the different resources will now be discussed via flowchart in FIG. 11. Note that the steps in the flowcharts below can be executed in any suitable order.

Figure 11:
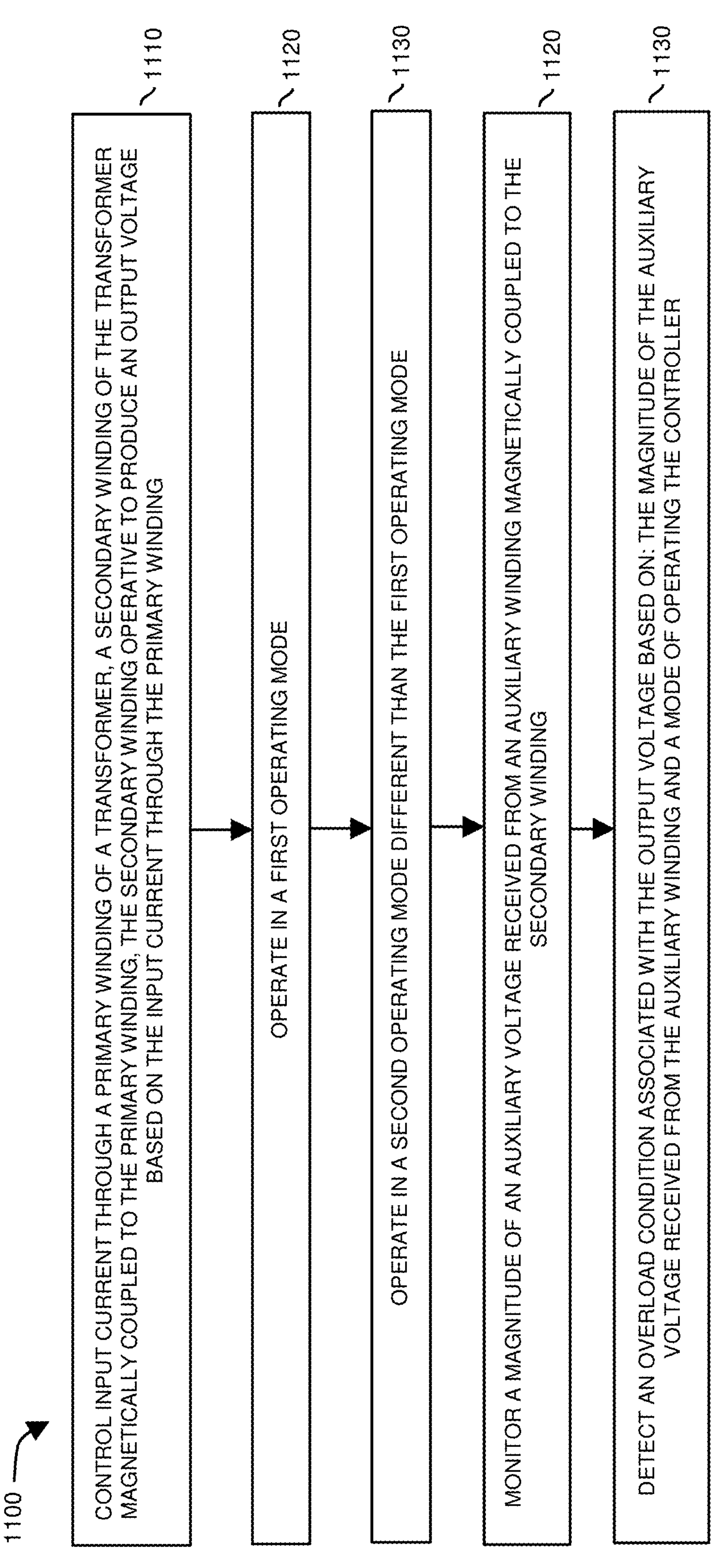
FIG. 11 is an example diagram illustrating a method as discussed herein.

FIG. 11 is an example diagram illustrating a method of overload protection as described herein.

In processing operation 1110, the controller 140 controls input current 121 through a primary winding 131 of a transformer 130. A secondary winding 133 of the transformer 130 is magnetically coupled to the primary winding 131. The secondary winding 131 produces an output voltage 123 based on the input current 121 through the primary winding.

In processing operation 1120, the controller operates in a first operating mode (such as burst mode).

In processing operation 1130, the controller operates in a second operating mode (such as non-burst mode) different than the first operating mode.

In processing operation 1140, the controller 140 monitors a magnitude of an auxiliary voltage 165 (VCC) received from an auxiliary winding 134 magnetically coupled to the secondary winding 133.

In processing operation 1150, the controller 140 detects an overload condition associated with the output voltage 123 based on: the magnitude of the auxiliary voltage 165 (VCC) received from the auxiliary winding 134 and a mode of operating the controller 140 and switching of switches S1 and S2 in the non-burst mode.

Note again that techniques herein are well suited for use in circuit applications such as those that implement power conversion and overload-protection. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:

a controller operative to:

control input current through a primary winding of a transformer, a secondary winding of the transformer magnetically coupled to the primary winding, the secondary winding operative to produce an output voltage based on the input current through the primary winding;

operate in a first operating mode;

operate in a second operating mode different than the first operating mode;

monitor a magnitude of an auxiliary voltage received from an auxiliary winding magnetically coupled to the secondary winding;

detect an overload condition associated with the output voltage based on: the magnitude of the auxiliary voltage received from the auxiliary winding and a mode of operating the controller;

wherein a circuit powered by the output voltage is selectable between a first output voltage mode and a second output voltage mode:

wherein the circuit includes a feedback signal generator operative to produce a feedback signal based on a magnitude of the output voltage; and wherein the controller is further operative to: use the feedback signal as a basis to regulate a magnitude of the output voltage.

2. The apparatus as in claim 1, wherein, to detect the overload condition, the controller is further operative to:

compare the magnitude of the auxiliary voltage to a threshold level; and determine occurrence of the overload condition based on the magnitude of the auxiliary voltage being below the threshold level and the controller operating in the first operating mode for a predetermined time duration.

3. The apparatus as in claim 1, wherein a circuit powered by the output voltage is selectable between: i) a first output voltage mode in which the circuit is configured to derive a feedback signal supplied to the controller based on a first gain value applied to a magnitude of the output voltage, and ii) a second output voltage mode in which the circuit is configured to derive the feedback signal supplied to the controller based on a second gain value applied to the magnitude of the output voltage; and wherein the controller is operative to regulate the magnitude of the output voltage based on comparison of the feedback signal to a reference voltage.

4. The apparatus as in claim 1, wherein the controller is operative to: i) during the first output voltage mode, regulate the magnitude of the output voltage to a first voltage level, and ii) during the second output voltage mode, regulate a magnitude of the output voltage to a second voltage level, the second voltage level being less than the first voltage level.

5. The apparatus as in claim 1, wherein the controller is operative to detect the overload condition associated with the output voltage during operation of the circuit in the second output voltage mode.

6. The apparatus as in claim 1, wherein the secondary winding is disposed in a galvanically isolated domain with respect to the primary winding, the secondary winding having circuitry deriving the feedback signal from the output voltage; and wherein the feedback signal is received by the controller in a galvanically isolated manner.

7. The apparatus as in claim 5, wherein the feedback signal generator is operative to adjust the feedback signal depending on setting of the circuit to the first output voltage mode versus the second output voltage mode, selection of the first output voltage mode resulting in the controller producing the output voltage at a first magnitude, selection of the second output voltage mode resulting in the controller producing the output voltage at a second magnitude.

8. The apparatus as in claim 1 further comprising:

multiple switches controlled by the controller, the controller operative to operate the multiple switches in the first operating mode and the second operating mode, the first operating mode being a non-burst mode, the second operating mode being a burst mode;

wherein operation in the burst mode includes repeatedly switching of the multiple switches ON and OFF in a first sequence of multiple control cycles followed by simultaneous deactivation of the multiple switches in a break including a second sequence of multiple control cycles; and wherein operation in the non-burst mode includes switching of the multiple switches ON and OFF in a third sequence of multiple control cycles without implementing the break of simultaneously deactivating the multiple switches.

9. The apparatus as in claim 1 further comprising:

multiple switches controlled by the controller, the controller operative to: i) in the first operating mode, implement a first sequence of switch control cycles of switching the multiple switches ON and OFF to increase a magnitude of the input current through the primary winding and ii) in the second operating mode, implement a second sequence of switch control cycles of simultaneously deactivating the multiple switches to decrease the magnitude of the input current through the primary winding.

10. A method comprising:

via a controller:

controlling input current through a primary winding of a transformer, a secondary winding of the transformer magnetically coupled to the primary winding, the secondary winding operative to produce an output voltage based on the input current through the primary winding;

operating in a first operating mode;

operating in a second operating mode different than the first operating mode;

monitoring a magnitude of an auxiliary voltage received from an auxiliary winding magnetically coupled to the secondary winding; and detecting an overload condition associated with the output voltage based on the magnitude of the auxiliary voltage received from the auxiliary winding and a mode of operating the controller;

wherein controlling the input current through the primary winding includes:

at the controller, receiving a feedback signal from a circuit powered by the output voltage, the circuit being selectable between: i) a first output voltage mode in which the circuit generates the feedback signal based on a first gain value applied to a magnitude of the output voltage, and ii) a second output voltage mode in which the circuit derives the feedback signal supplied to the controller based on a second gain value applied to the magnitude of the output voltage.

11. The method as in claim 10, wherein detecting the overload condition includes:

comparing the magnitude of the auxiliary voltage to a threshold level; and determining occurrence of the overload condition based on the magnitude of the auxiliary voltage being below the threshold level for a predetermined time duration while the controller implements the first operating mode to control the input current.

12. The method as in claim 10, wherein the overload condition is an overcurrent condition of the output voltage supplying an output current to a load.

13. The method as in claim 10, wherein the first operating mode is a continuous operational mode of controlling switches coupled to the primary winding, control of the switches controlling a magnitude of the input current through the primary winding.

14. The method as in claim 10, wherein controlling the input current through the primary winding in the transformer includes regulating a magnitude of the output voltage based on the feedback signal.

15. The method as in claim 10, wherein operating the controller in the first operating mode includes, via the controller, controlling supply of a first magnitude of the input current through the primary winding;

wherein operating the controller in the second operating mode includes, via the controller, controlling supply of a second magnitude of the input current through the primary winding, the second magnitude greater than the first magnitude; and wherein detecting the overload condition includes simultaneously detecting: i) execution of the controller in the second operating mode, and ii) the magnitude of the auxiliary voltage being less than a threshold level for a predetermined amount of time.

16. The method as in claim 15 further comprising:

via the controller, detecting a non-overload condition associated with the output voltage based on simultaneously detecting: i) execution of the controller in the first operating mode, and ii) the magnitude of the auxiliary voltage being less than the threshold level.

17. An apparatus comprising:

a controller operative to:

control input current through a primary winding of a transformer, a secondary winding of the transformer magnetically coupled to the primary winding, the secondary winding operative to produce an output voltage based on the input current through the primary winding;

operate in a first operating mode;

operate in a second operating mode different than the first operating mode;

monitor a magnitude of an auxiliary voltage received from an auxiliary winding magnetically coupled to the secondary winding;

detect an overload condition associated with the output voltage based on: the magnitude of the auxiliary voltage received from the auxiliary winding and a mode of operating the controller;

wherein execution of the controller in the first operating mode is operative to supply a first magnitude of the input current through the primary winding;

wherein execution of the controller in the second operating mode is operative to supply a second magnitude of the input current through the primary winding, the second magnitude greater than the first magnitude; and wherein the controller is operative to detect the overload condition based on the magnitude of the auxiliary voltage being less than a threshold level for a predetermined amount of time while the controller operates in the second operating mode.

18. An apparatus comprising:

a controller operative to:

control input current through a primary winding of a transformer, a secondary winding of the transformer magnetically coupled to the primary winding, the secondary winding operative to produce an output voltage based on the input current through the primary winding;

monitor a magnitude of the input current through the primary winding;

monitor a magnitude of an auxiliary voltage received from an auxiliary winding magnetically coupled to the primary winding;

monitor for overload conditions associated with the output voltage based on: i) the magnitude of the input current through the primary winding, and ii) the magnitude of the auxiliary voltage received from the auxiliary winding;

wherein the controller is further operative to detect a first overload condition associated with the output voltage based on the magnitude of the input current through the primary winding being above a current threshold value during a first output voltage mode of operating a load powered by the output voltage; and wherein the controller is further operative to detect a second overload condition associated with the output voltage based on the magnitude of the auxiliary voltage received from the auxiliary winding being less than a voltage threshold level during a second output voltage mode of operating the load powered by the output voltage.

19. The method as in claim 17, wherein the controller is operative to detect a non-overload condition associated with the output voltage based on simultaneous detection of: i) execution of the controller in the first operating mode, and ii) the magnitude of the auxiliary voltage being less than the threshold level.

20. The apparatus as in claim 18, wherein the load is circuitry powered by the output voltage; and wherein a user controls operation of the circuitry between the first output voltage mode and the second output voltage mode.

* * * * *